July 20, 1926.

G. FLINTERMANN

JOURNAL BEARING

Filed July 28, 1925

INVENTOR
Gerhard Flintermann
BY
ATTORNEYS

July 20, 1926.

G. FLINTERMANN

JOURNAL BEARING

Filed July 28, 1925    2 Sheets-Sheet 2

1,593,251

INVENTOR
Gerhard Flintermann
BY
Pennie, Davis, Marvin & Edmonds
ATTORNEYS

Patented July 20, 1926.

1,593,251

UNITED STATES PATENT OFFICE.

GERHARD FLINTERMANN, OF ORANGE, NEW JERSEY.

JOURNAL BEARING.

Application filed July 28, 1925. Serial No. 46,547.

This invention relates to journal bearings and has for its principal object the provision of a journal bearing of increased efficiency.

Another object of the invention is to improve the lubrication in a bearing of this type.

A further object is to provide a journal bearing in which the stresses and strains are uniformly distributed.

A further object of the invention is to provide an improved journal bearing in which wedge-shaped oil pockets are formed between the stationary friction surfaces and the rotating part supported by the bearing.

It is a further object of the invention to so construct a journal bearing that the formation of the above mentioned wedge-shaped oil pockets is facilitated.

An additional object is to provide a journal bearing in which the area of the bearing pads and other friction surfaces may be reduced.

Certain additional objects will appear from the following description.

Several embodiments of the invention are illustrated in the accompanying drawings, in which—

Figure 1:
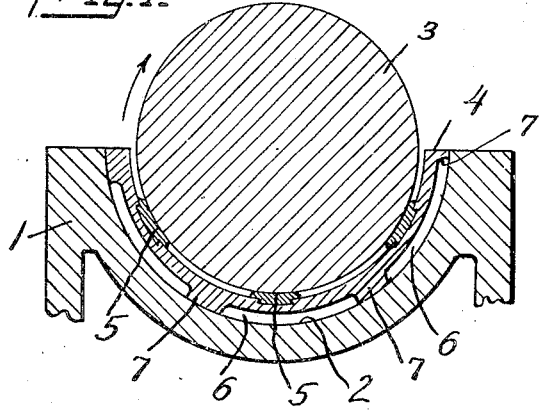
Fig. 1 is a transverse section of one form of journal bearing constructed in accordance with the invention.
Figure 2:
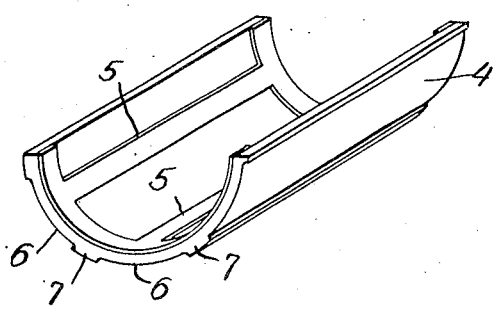
Fig. 2 is a detail perspective view of the bearing element or bushing employed in Fig. 1.

Referring first to Figs. 1 and 2, the improved journal bearing comprises a bearing housing 1 of any appropriate shape and design. The lower portion of this housing is shown broken away as it forms no part of the present invention. The housing 1 has a concave trough-shaped section 2, as is usual in bearings of this type, for accommodating the journal portion of a shaft 3. The shaft 3 may be a machine shaft, a crank shaft, the axle of a vehicle, or any rotating shaft for which it is desired to provide a journal bearing. Located between the journal of the shaft 3 and the trough-shaped section 2 of the housing is the bearing element or bushing 4. The bushing 4 is provided with a plurality of bearing projections 5 which, in Fig. 1, are represented as bearing pads preferably of Babbitt metal attached to the bushing 4. The under side of the bushing 4 has a cut out portion or clearance 6 under each pad 5. These clearances result in a plurality of legs 7 on the bushing which support the latter in the trough 2 of the housing 1. Each pad 5 is located between two of the supporting legs 7 but is nearer to one leg than the other as shown in the drawing, the leg to which the pad is nearest being the one which is farthest along in the direction of rotation of the shaft. The portions of the bushing 4 between the supporting legs 7 should be made sufficiently resilient or flexible to permit these portions to be deflected by the load on the bearing, the deflection of these portions being permitted by the clearances 6 directly under them. When the load deflects these portions of the bushing it is obvious that the forward edge of each pad 5 (the term "forward" having reference to the direction of rotation of the shaft) will move farther away from the surface of the shaft than the rear edge of the pad due to the fact that each pad is located beyond the mid point of the bridge-like section on which it is mounted. This action results in the formation of a wedge-shaped oil pocket in which the oil is forced by the rotation of the shaft. In this way a relatively high pressure is built up and the wedge-shaped bodies of oil tend to keep the surfaces separated. The compression of the oil in each wedge-shaped pocket produces a resultant force which acts radially inward toward the center of the shaft. In other words, each wedge-shaped body of oil contributes a share in tending to force the shaft upwardly and thereby increasing the efficiency of the bearing. For this reason, it is preferable to have the pads 5 so arranged that the resultant force obtained by all of the pads acts in the opposite direction to, or in other words directly counteracts the weight or load, so that no force tends to throw the shaft out of alignment. In order to effect this, it is preferable in most instances to have the pads symmetrically arranged about the center of the shaft or very nearly so as shown in Figs. 1 and 2.

Figure 3:
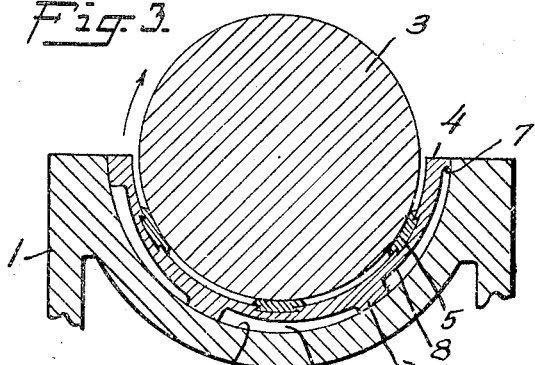
Figs. 3 to 14 are transverse sections of modified forms of journal bearings constructed in accordance with the invention.

In Fig. 3 the clearances 6 are so formed on the bushing 4 that the bridge-like portions between the supporting legs 7 are tapered as shown at 8. The taper is in a direction which will cause the forward end of each bridge-like portion to be thicker than the rear end, the terms "forward end" and "rear end" having reference to the direction of rotation of the shaft. Each pad 5 is preferably located over the thinner end of its corresponding bridge-like portion of the bushing. This taper on the bridge-like portions of the bushing facilitates the deflection of them by the load and favors the formation of the wedge-shaped pockets described above.

Figure 4:
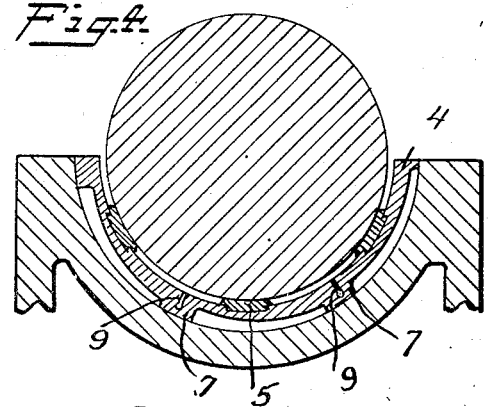

In Fig. 4 the deflection of the bridge-like portions of the bushings 4 is further facilitated by cutting or slitting the bushing radially from its innermost surface toward its outer surface at points directly over the supporting legs 7 as shown at 9. According to Fig. 4 these slits extend only part way through the bushing.

Figure 5:
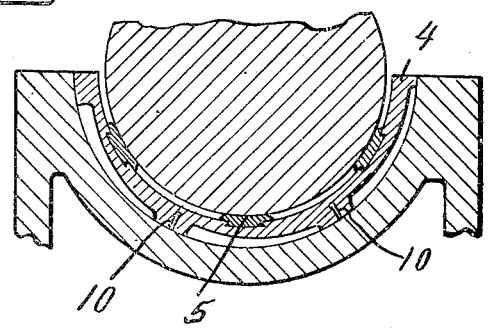

In Fig. 5 the bushing is provided with cuts or slits 10 which extend from the outer surface of the bushing toward the inner surface but do not pass entirely through the bushing. These slits are also for the purpose of facilitating deflection of the bridge-like portions of the bushing.

Figure 6:
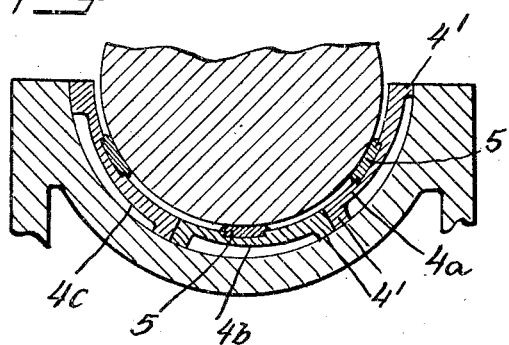

In Fig. 6 the cuts or slits 9 and 10 of Figs. 4 and 5 extend entirely through the bushing and the effect is to divide the bushing into separate sections or elements $4^a$, $4^b$ and $4^c$ each of which has its own supporting legs 4' and an intermediate bridge-like portion on which one of the bearing pads 5 is mounted.

Figure 7:
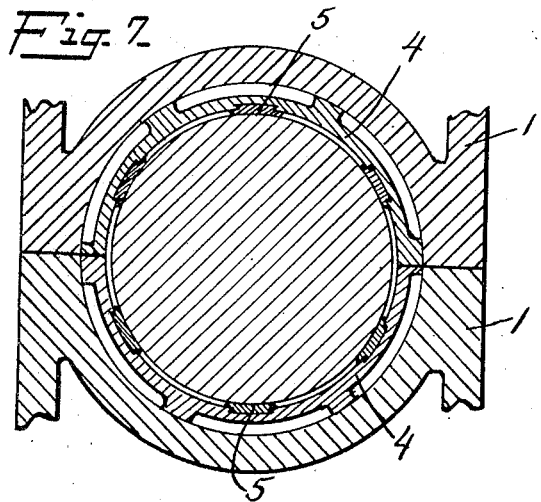

In the preceding figures it has been assumed that the bushing and housing for the upper half of the shaft are unnecessary. Fig. 7 corresponds to Fig. 1 except that the upper half of the shaft is also provided with a bushing 4 and housing section 1. Whenever a bushing is employed for the upper half of the shaft its construction may be identical with that of the bushing for the lower half. The arrangement shown in Fig. 7 in which the journal of the shaft is completely surrounded by the bearing is particularly useful in connection with vertical shafts but may be used for any other kind of shaft where it is desirable to completely surround the journal by the bearing.

Figure 8:
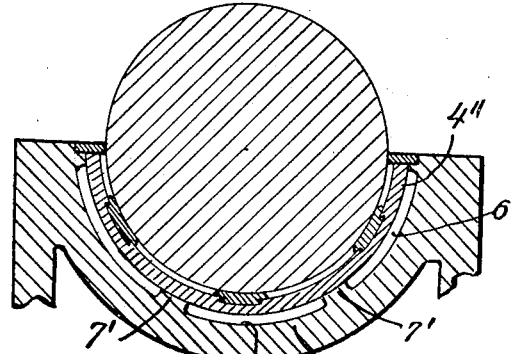

Instead of having the supporting legs 7 on the bushing 4, they may be provided on the housing 1. This arrangement is illustrated in Fig. 8 in which the bushing is represented at 4". The supporting legs are shown at 7' and in this instance are formed on the trough shaped section 2 of the housing 1. These legs or supports 7' provide clearances 6 which perform the same function as the clearances described in connection with the other figures. Each section of the bushing 4" which is supported between two adjacent legs or projections 7' constitutes a bridge-like portion which is deflected by the load in the same manner as described above, and wedge-shaped oil pockets are formed in the same manner as above set forth.

Figure 9:
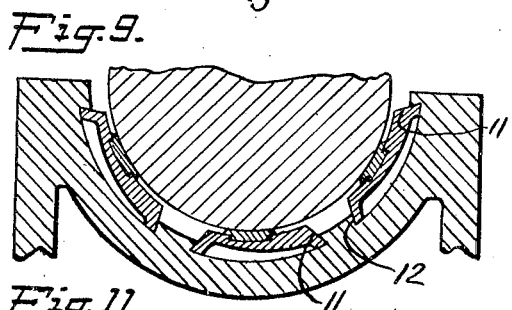

In Fig. 9 the bushing is in the form of separate sections or elements as in Fig. 6, but each element has beveled edges 11 and the trough shaped section of the housing is provided with dove-tail seats or recesses 12 in which the elements 11 are positioned. In this way each element is locked in position in the housing 1.

Figure 10:
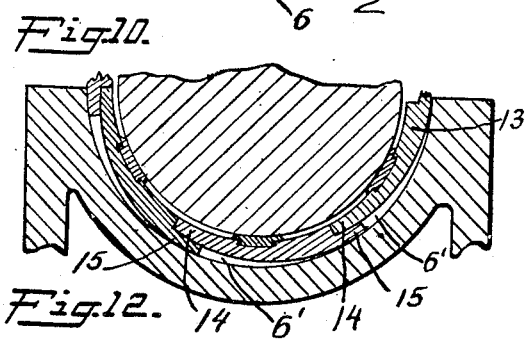

In Fig. 10 the bushing is in the form of separate sections or elements each of which gradually tapers from its forward thick end 13 to its rear thin end 14. The thick end of each element may have a seat or recess 15 for supporting the thin end of the next adjacent element. In this way clearances 6' are formed under the thin end of each section and under the pad 5 mounted on the thin end. The clearances 6' permit the elements to deflect and the taper on the elements facilitates the deflections as in all of the other modifications in which the taper is employed. The overlaping of the ends of the elements interlocks them and assists in holding them in place.

Figure 11:
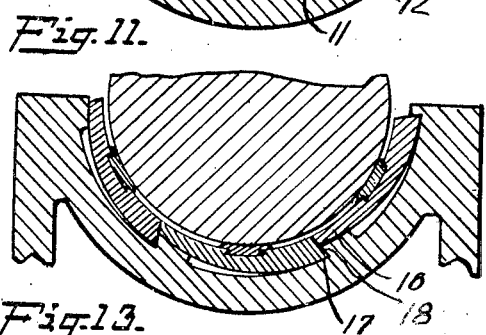

In Fig. 11 the bushing is in the form of separate elements or sections each of which is tapered from its forward thick end to its rear thin end. In this instance the trough shaped element of the housing 1 is provided with projections or supports each of which is so formed as to provide a relatively high seat 16 for the thin end of each element and a lower seat 17 for the thick end of the next adjacent element. The wall 18 between these seats may be inclined or beveled as shown in this figure and the adjoining edge surface of the element may be correspondingly inclined or beveled to lock the element to the bearing housing.

Figure 12:
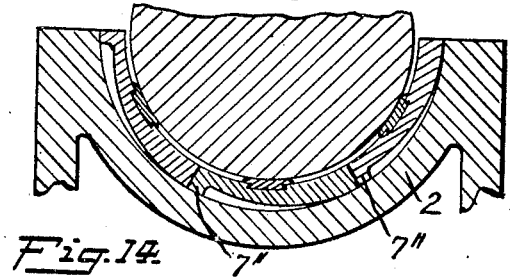

In Fig. 12 the bushing is in the form of separate tapered sections or elements, the forward thick end of each element resting directly on the surface of the trough shaped section 2 and the rear thin end of the element being supported and spaced away from the trough shaped section by a supporting leg 7". The pads are located over the thin portions of the elements and these thin portions are deflected by the load, such deflection being permitted by the clearances provided under the thin ends of the elements.

Figure 13:
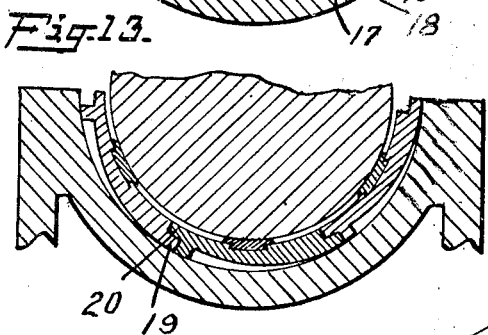

In Fig. 13 the separate sections or elements are interlocked by providing a projecting foot 19 on one end of each element which lies under a projecting portion 20 on the adjacent end of the next element.

Figure 14:
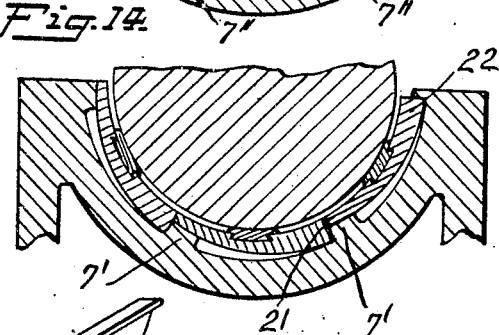

According to Fig. 14 each bearing element or section is tapered from its forward thick end to its thin rear end but each element is a composite one made up of an upper tapered section 21 and a lower tapered section 22. The dividing of the element into two portions in this manner further facilitates the deflection of the element by the load. Projections 7' may be provided on the surface of the trough-like portion of the housing for supporting the thin ends of the elements and thereby spacing them away from the surface of the housing to provide the necessary clearances for deflection purposes.

Figure 15:
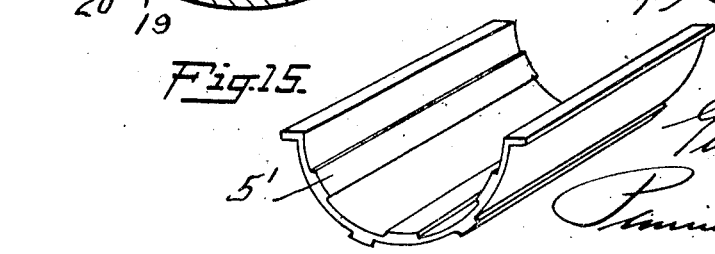
Fig. 15 is a detail perspective view of the bearing element or bushing showing the friction pads formed integrally with the bushing.

In any of the forms of the invention described above the friction pads 5 may be in the nature of integral bearing projections on the bushing or on the elements. This is illustrated in Fig. 15 in which the bushing is substantially like that shown in Figs. 1 and 2 except that it is provided with integral projecting portions 5' which perform the same function as the friction pads in the other figures. The bearing projection 5' may be the same material as the body of the bushing and the latter may be metal or any other appropriate material. While this feature of making the bearing projections integral with the bearing element is illustrated in connection with a bushing type of element, it will be understood that it also applies to the other forms of the invention in which the bushing is in sections or in which separate elements are employed.

By constructing the bushing or separate bearing elements in such a way that the deflection is facilitated, the surface of friction pads or bearing projections may be made relatively small in area to obtain a certain deflection for a given load. This renders it possible to space the pads or bearing projections relatively far apart and the intervening relatively long spaces constitute oil pockets in which the oil has time to cool before it is passed on into the next succeeding wedge-shaped space. This is an important feature as the oil which emerges from one wedge-shaped space has time to cool and regain its normal viscosity before it is called upon to do additional work in the succeeding wedge-shaped space. This successive cooling of the oil adds materially to the efficiency of the lubricating system.

The particular construction of the bushing or separate bearing elements causes the stresses and strains to be properly distributed and this is particularly true in those forms of the bearing in which portions of the bushing or the separate bearing element are tapered.

While certain portions of the bushing and of the separate bearing elements are shown as being tapered for the purpose of facilitating deflection, the thing which is actually responsible for facilitating the deflecting action is the varying thickness and instead of actually tapering the bearing elements or portions of the bushing the thicknesses may be varied in any other appropriate way.

It will be noted that in all of the forms of the journal bearing each friction pad or bearing projection is located on a bridge-like yielding part between two supports which provide a clearance in back of the fricition pad to permit deflection of that portion of the bearing element on which the pad is mounted.

It should be understood that the bushing or separate bearing elements may be fastened or secured in position by any suitable means such as screws, bolts or rivets, if so desired.

I claim:

1. A journal bearing for rotary members comprising a support, a bushing section having a plurality of integral supporting projections extending longitudinally of the rotary member and spaced apart circumferentially to space the intervening portions of the bushing from said support, and a plurality of integral bearing projections the surfaces of which are adapted to abut against said rotary member, each of said bearing projections being located between two of said supporting projections but located nearer to one of such supporting projections than the other and each bearing projection throughout its circumferential length being in direct contact with the yielding portion which carries it and being directly supported throughout its circumferential length by said yielding portion.

2. A journal bearing for rotary members comprising a support, a bushing section having a plurality of integral supporting projections extending longitudinally of the rotary member and spaced apart circumferentially to space the intervening portions of the bushing from said support, and a plurality of bearing projections, the surfaces of which are adapted to abut against said rotary member, each of said bearing projections being located between two of said supporting projections and each portion of the bushing section between said supporting projections being tapered circumferentially of the bearing throughout at least a portion of its length.

3. A journal bearing for rotary members comprising a bushing section, a support therefor, said bushing section having at least one yielding portion supported at its ends along lines extending longitudinally of the rotary member and spaced apart circumferentially to provide a clearance under the yielding portion, and a bearing projection on said yielding portion the surface of which is adapted to abut against said rotary member and located nearer to one end of the yielding portion than the other.

4. A journal bearing for rotary members comprising a bushing section, a support therefor, said bushing section having at least one yielding portion supported at its ends along lines extending longitudinally of the rotary member and spaced apart circumferentially to provide a clearance under the yielding portion, and a bearing projection on said yielding portion the surface of which is adapted to abut against said rotary member and located nearer to one end of the yielding portion than the other, said yielding portion being of varying thickness circumferentially of the bearing.

5. A journal bearing for rotary members comprising a bushing section, a support therefor, said bushing section having at least one yielding portion supported at its ends along lines extending longitudinally of the rotary member and spaced apart circumferentially to provide a clearance under the yielding portion, and a bearing projection on said yielding portion the surface of which is adapted to abut against said rotary member, said yielding portion being of varying thickness circumferentially of the bearing.

6. A journal bearing for rotary members comprising a support, a bushing section having at least two integral supporting projections extending longitudinally of the rotary member and spaced apart circumferentially to space the intervening portion of the bushing from said support, said intervening portion of the bushing having an integral bearing projection, the surface of which is adapted to abut against said rotary member, said bearing projection being located nearer to one of said supporting projections than the other and throughout its circumferential length being in direct contact with said intervening portion of the bushing and being supported throughout its circumferential length directly by such intervening portion of the bushing.

In testimony whereof I affix my signature.

GERHARD FLINTERMANN.